(12) United States Patent
Doyle (10) Patent No.: US 6,708,985 B1
(45) Date of Patent: Mar. 23, 2004

(54) RING SEAL AND RETAINER ASSEMBLY

(76) Inventor: Michael Doyle, 10001 Timothy La., Villa Park, CA (US) 92861

( * ) Notice: Subject to any disclaimer, the term of this patent is extended or adjusted under 35 U.S.C. 154(b) by 0 days.

(21) Appl. No.: 10/187,129

(22) Filed: Jun. 28, 2002

(51) Int. Cl.$^7$ ................................................. F16L 17/00
(52) U.S. Cl. ...................... 277/616; 277/602; 277/608; 277/609; 285/328; 285/330; 285/379; 285/609
(58) Field of Search ................................. 285/328, 609, 285/330, 379, 910, 917; 277/602, 608, 609, 616

(56) References Cited

U.S. PATENT DOCUMENTS

| | | | | |
|---|---|---|---|---|
| 3,834,744 A | * | 9/1974 | Masatchi | 277/607 |
| 4,496,176 A | * | 1/1985 | Weinhold | 285/365 |
| 4,685,707 A | * | 8/1987 | Miyashita | 285/328 |
| 4,838,583 A | * | 6/1989 | Babuder et al. | 285/354 |
| 5,106,128 A | * | 4/1992 | Dugast et al. | 285/93 |
| 5,163,721 A | * | 11/1992 | Babuder | 285/328 |

* cited by examiner

*Primary Examiner*—Anthony Knight
*Assistant Examiner*—Enoch Peavey
(74) *Attorney, Agent, or Firm*—Drummond & Duckworth (57) ABSTRACT

The ring seal and retainer assembly includes an annularly shaped ring seal defining a radial inner surface, a radial outer surface, first and second axial end surfaces and a central bore for fluid or gas passage. A retainer is provided for affixing and positioning a ring seal in a sealing assembly. The retainer includes a circular sidewall sized and positioned to engage and cover the ring seal's radial outer surface. The retainer further includes a means for affixing the circular sidewall to the ring seal. In a first embodiment, the retainer includes an inwardly projecting ridge for projecting into a groove formed on the ring seal's radial outer surface. In an additional embodiment, the retainer includes a plurality of ridge segments which project into the ring seal's groove. In still an additional embodiment, the circular sidewall includes upper and lower inwardly projecting edges forming a "C" shaped cross-section. The recess of the "C" is sized and positioned to receive the outer edge of the ring seal to affix the ring seal to the retainer. Also preferably, the retainer includes one or more detents sized and configured to reside within a recess formed in the sealing assembly to affix the ring seal and retainer assembly in place between two axially opposed sealing surfaces.

20 Claims, 8 Drawing Sheets

RING SEAL AND RETAINER ASSEMBLY

BACKGROUND OF THE INVENTION

The present invention relates to seals, often referred to as gaskets, for making a fluid or gas tight joint between opposed mating surfaces. More particularly, the present invention relates to retainers for positioning seals between opposed mating surfaces.

Ring seals are typically annularly shaped, defining an axially aligned hole for gas or fluid passage, two axially opposed end surfaces, a radial inner surface and a radial outer surface. The most simplistic ring seal includes planar end surfaces and smooth circular radial inner and outer surfaces which define the inner diameter (ID) and outer diameter (OD) of the ring seal.

An additional commonly used ring seal is circular and has a radial cross-section of a "C" shape. These "C seals" are constructed with the open side of the C construction facing the center of the ring such as described in U.S. Pat. No. 5,354,072, or with the open side of the C facing away from the center of the ring. As two mating surfaces are brought together with the C seal in the middle, the C seal is compressed with the open side of the C cross-section closing during compression. The ductile properties of the seal permit plastic deformation to occur without damaging the mating surfaces.

Additional seals which have been available include "V seals" which are also circular, but instead of having a "C" cross-section, the V seal has a "V" cross-section with the low point of the V constructed to point either inwardly or outwardly towards the center of the seal. Moreover, seals in the art include "Z seals" and simple "O rings".

Figure 1:
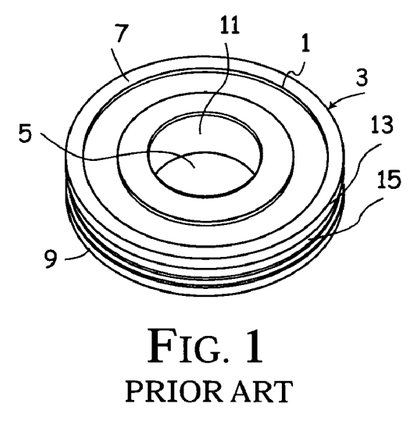
FIG. 1 is a perspective view illustrating a ring seal of the prior art.
Figure 2:
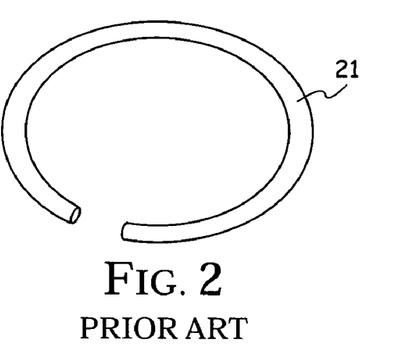
FIG. 2 is a perspective view illustrating a retainer of the prior art.
Figure 3:
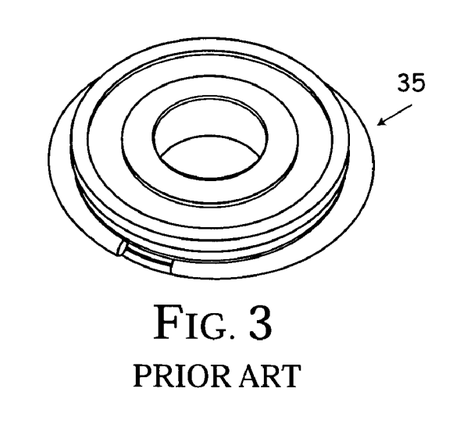
FIG. 3 is a perspective view illustrating a ring seal and retainer assembly of the prior art.
Figure 4:
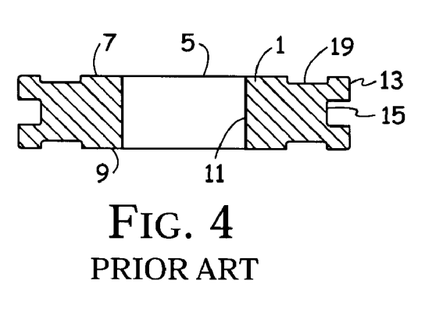
FIG. 4 is a cross-sectional view of the prior art retainer of FIG. 2.
Figure 5:
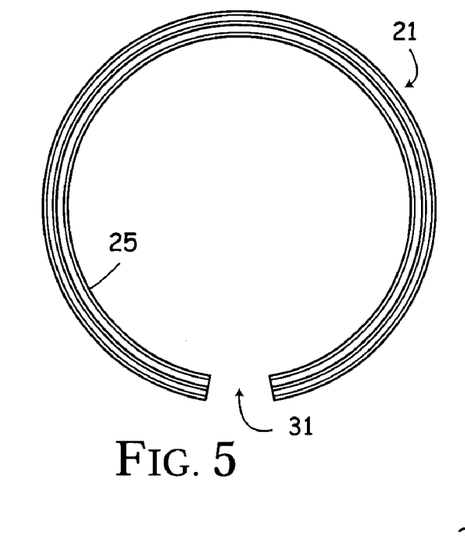
FIG. 5 is a top view illustrating a first embodiment of a retainer of the present invention.
Figure 6:
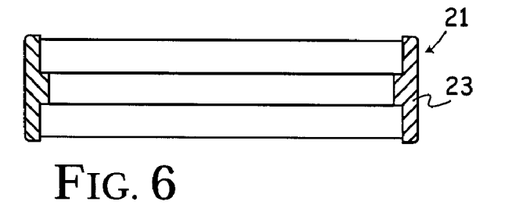
FIG. 6 is a front side cross-sectional view illustrating the retainer of FIG. 5.
Figure 7:
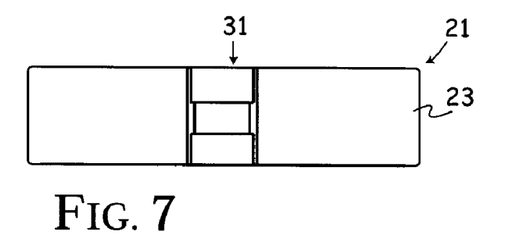
FIG. 7 is a front side view of the retainer of FIG. 5.
Figure 8:
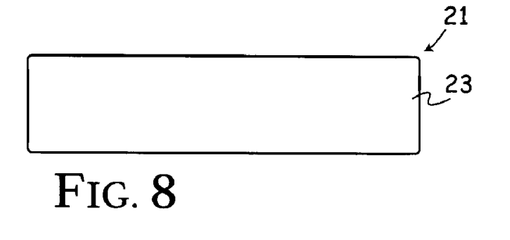
FIG. 8 is a side view of the retainer of FIG. 5.
Figure 9:
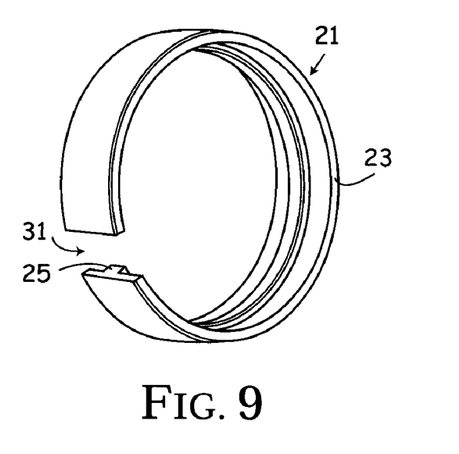
FIG. 9 is a perspective view illustrating the retainer of FIG. 5.
Figure 10:
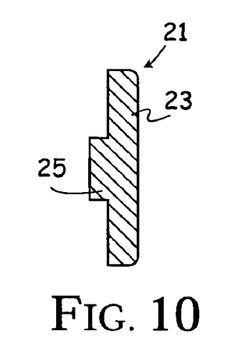
FIG. 10 is a cross-sectional view illustrating a cross section of the retainer of FIG. 5.
Figure 11:
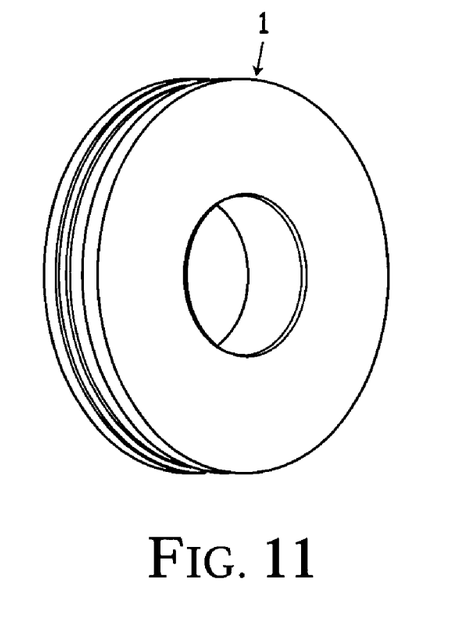
FIG. 11 is a perspective view illustrating a ring seal for use with the present invention.
Figure 12:
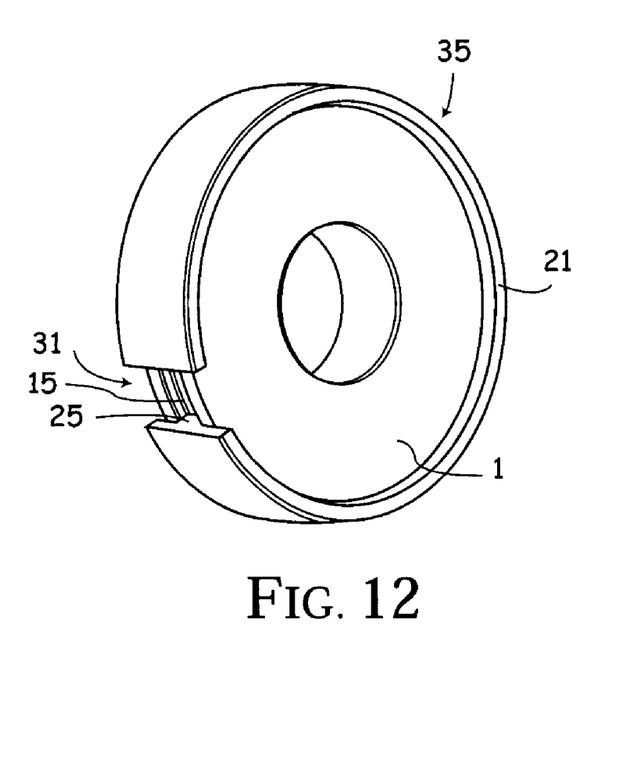
FIG. 12 is a ring seal and retainer assembly of the present invention utilizing the retainer of FIGS. 5–10.
Figure 13:
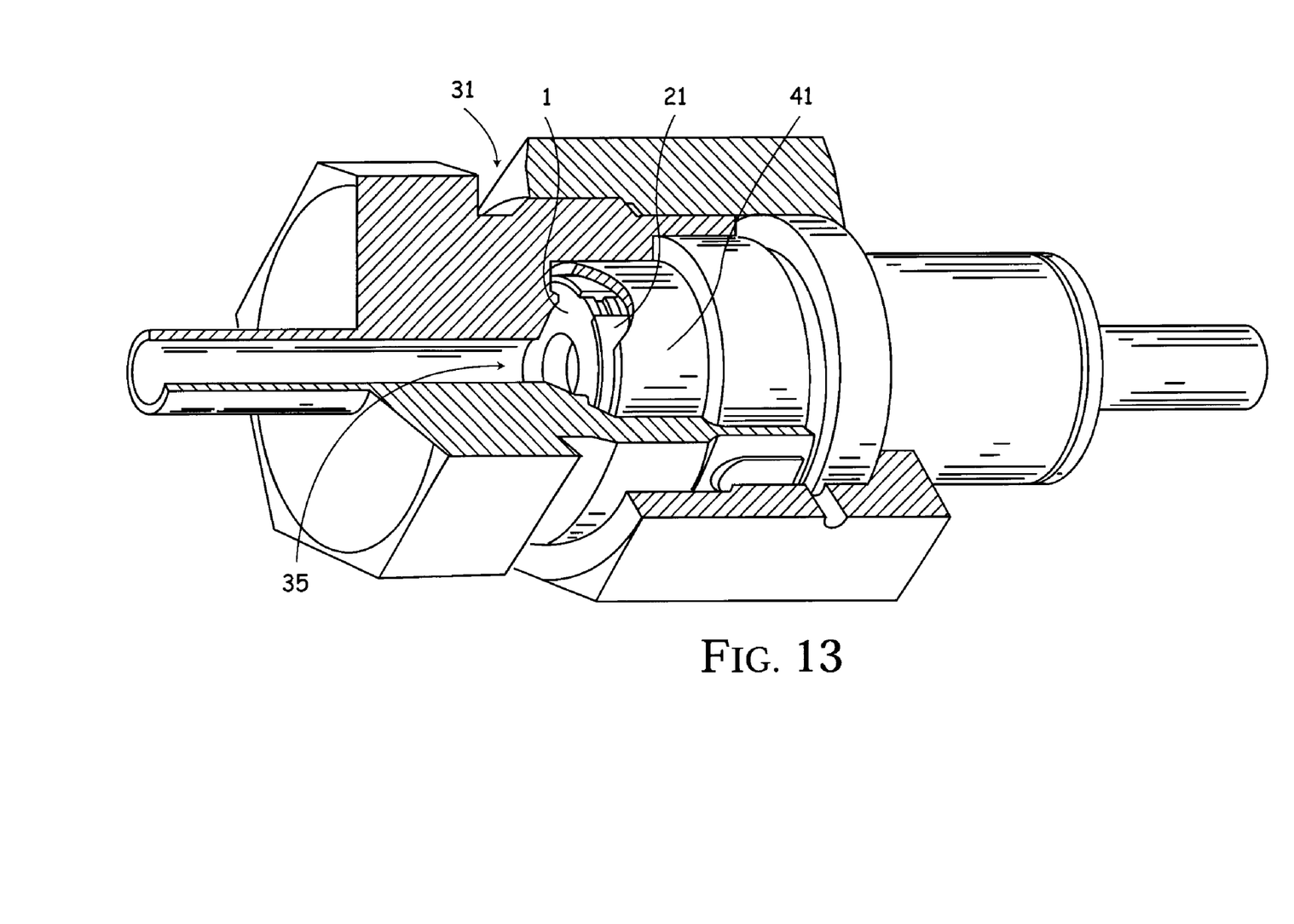
FIG. 13 is a perspective cutaway view illustrating a ring seal and retainer assembly of the present invention positioned within a sealing assembly.
Figure 14:
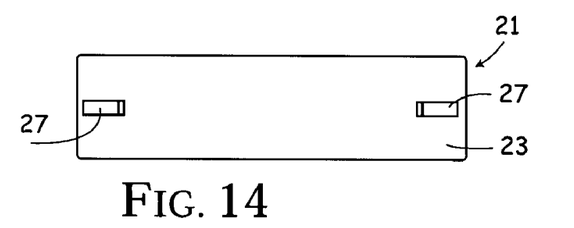
FIG. 14 is a front side view of a second embodiment of a retainer of the present invention.
Figure 15:
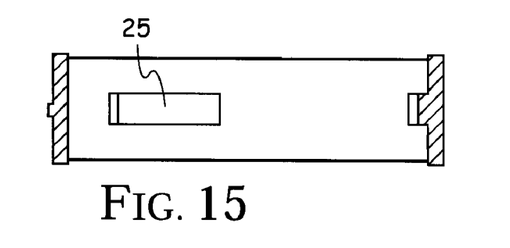
FIG. 15 is a cross-sectional front side view of the retainer of FIG. 14.
Figure 16:
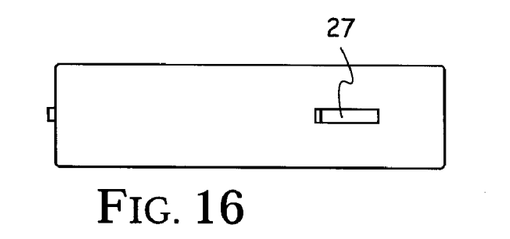
FIG. 16 is a left side view of the retainer of FIG. 14.
Figure 17:
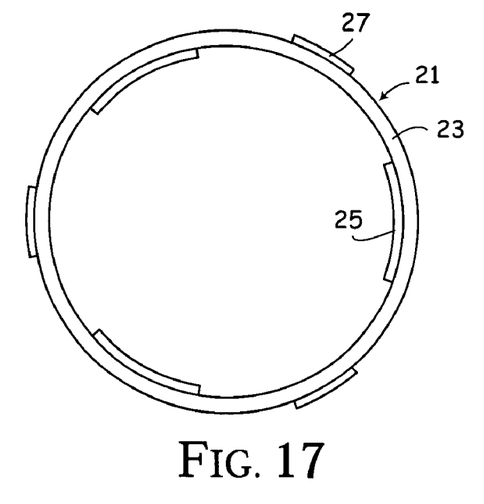
FIG. 17 is a top view of the retainer of FIG. 14.
Figure 18:
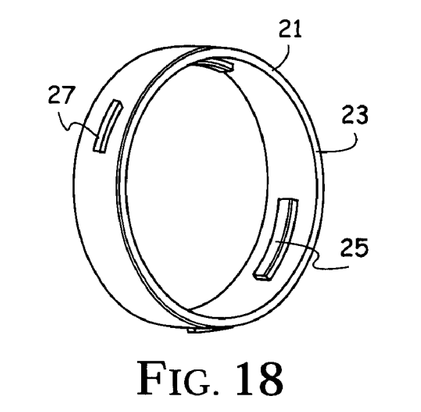
FIG. 18 is a perspective view of the retainer of FIG. 14.
Figure 19:
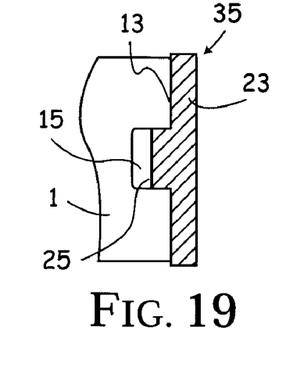
FIG. 19 is a cross-sectional side view of a ring seal and retainer assembly of the present invention utilizing the retainer of FIG. 14.
Figure 20:
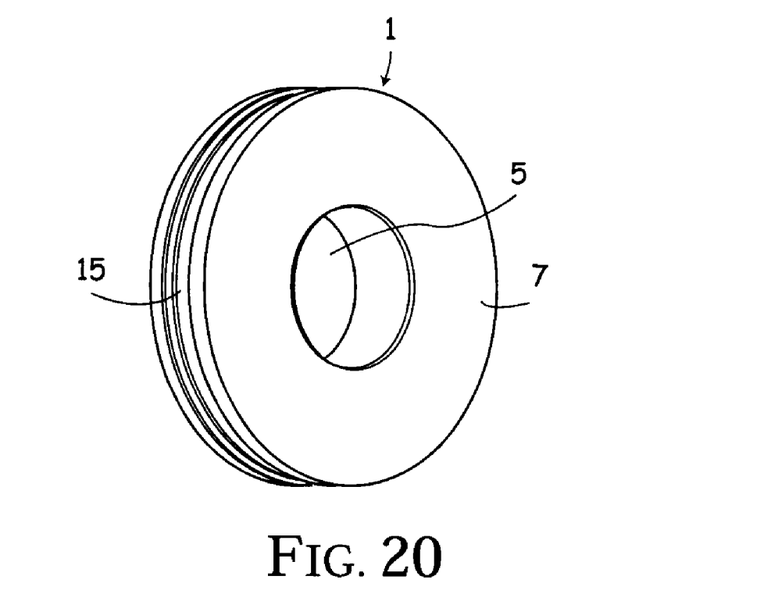
FIG. 20 is a perspective view illustrating a ring seal for use with the present invention.
Figure 21:
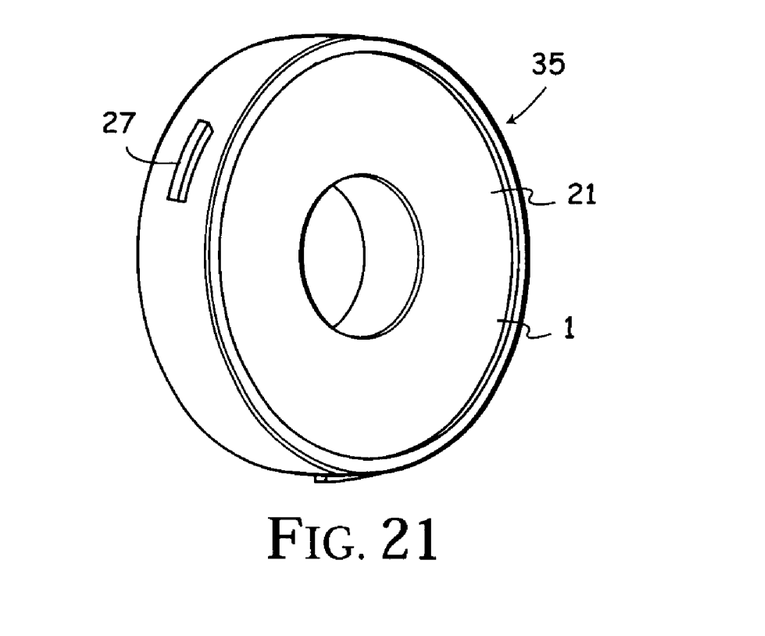
FIG. 21 is a perspective view of a ring seal and retainer assembly of the present invention utilizing a retainer of FIG. 14.
Figure 22:
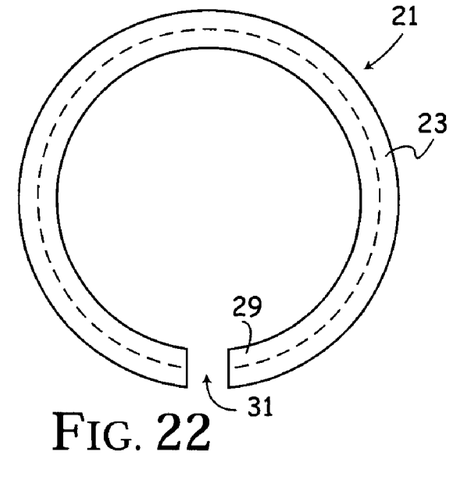
FIG. 22 is a top view of a third embodiment of a retainer of the present invention.
Figure 23:
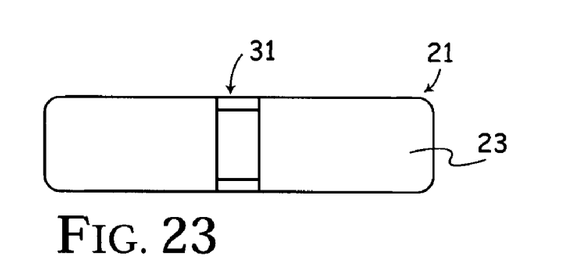
FIG. 23 is a front side view of the retainer of FIG. 22.
Figure 24:
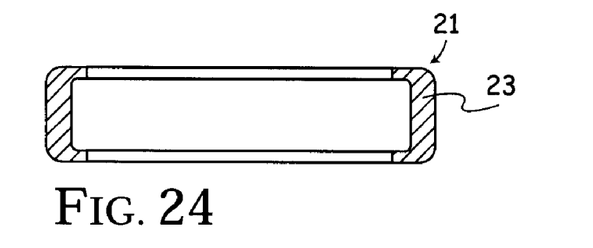
FIG. 24 is a cross-sectional side view of the retainer of FIG. 22.
Figure 25:
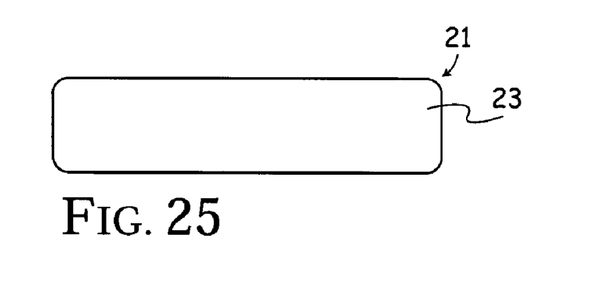
FIG. 25 is a left side view of the retainer of FIG. 22.
Figure 26:
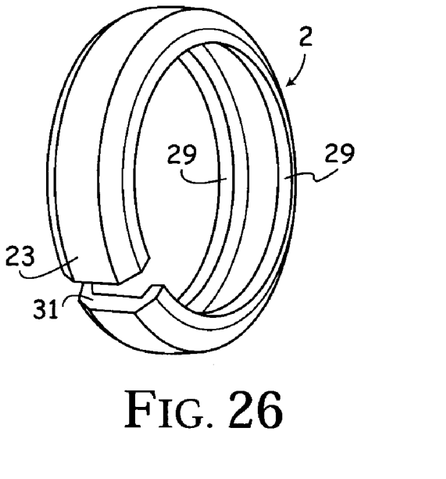
FIG. 26 is a perspective view of the retainer of FIG. 22.
Figure 27:
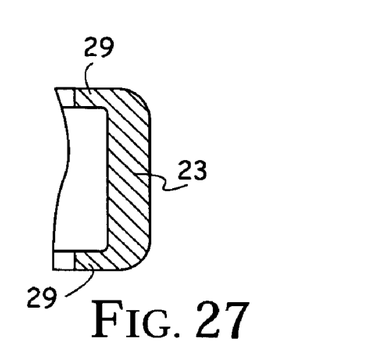
FIG. 27 is a cross-sectional side view of the retainer of FIG. 22.
Figure 28:
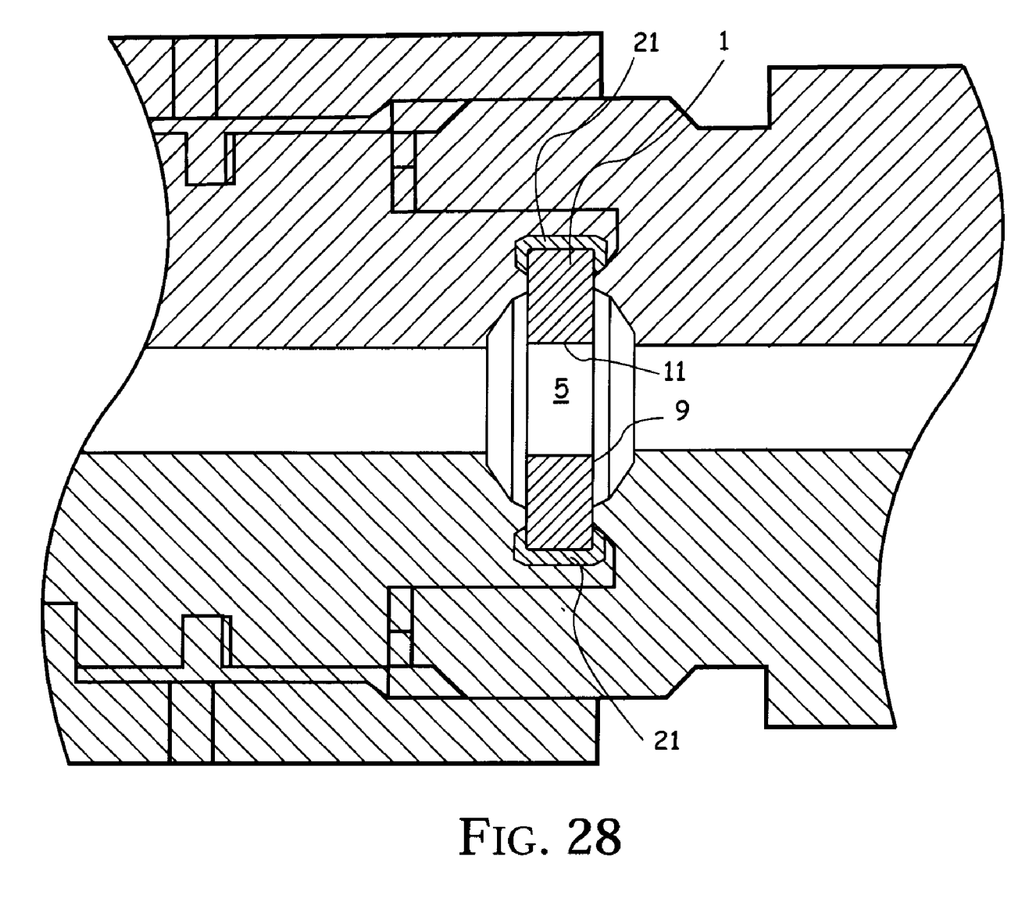
FIG. 28 is a side cross-sectional view illustrating a ring seal and retainer (of FIGS. 22–27) in a sealing assembly.

The above described ring seals often include a recessed sealing surface. With reference to FIGS. 1 and 4, the typical ring seal 1 includes an annular body configuration and a circumferential groove 15 formed on the ring seal's outer radial surface. In addition, the ring seal includes a recessed sealing surface 19 formed into each of the axial end surfaces. With reference to FIG. 28, in operation, the opposed mating surfaces 17 of the sealing assembly engage and form an air or fluid tight seal at the ring seal's recessed sealing surface. However, the opposed mating surfaces typically do not engage or form a seal at the ring seal's recessed regions. The sealing surface is recessed to protect the surface from becoming damaged during handling. For example, ring seals having planar surfaces often become scratched when placed on flat surfaces due to dirt or metal shavings scratching the ring seal's sealing surface. To overcome this drawback, the ring seal's sealing surface is recessed so as to not come into contact with debris prior to assembly within a sealing assembly. Unfortunately, ring seals having recessed sealing surfaces are expensive to manufacture and the recessed sealing surface is very difficult to polish.

Retainers are often used to hold and position a ring seal in place between two opposed mating surfaces. Retainers have been constructed in various forms. For example, U.S. Pat. No. 5,340,170 describes a retainer for positioning a gasket in a pipe joint. The retainer includes a cylindrical sidewall, an inwardly extending edge for engaging a ring seal and a plurality of claws for grabbing a pipe.

Meanwhile, U.S. Pat. No. 5,423,580 discloses a retainer having a semicircular sidewall for grasping the outer edge of a ring seal and extremity of a pipe. Moreover, additional retainer arrangements are disclosed in U.S. Pat. Nos. 4,552,389; 4,650,227; and 4,838,583.

An additional prior art ring seal and retainer assembly is shown in FIGS. 1–4. The ring seal includes a typical annular body configuration and circumferential groove formed on the ring seal's outer radial surface. In addition, the ring seal includes a recessed sealing surface 19 formed on each of the axial end surfaces. The retainer is obtained from a single loop of a coil spring, which is then formed into a circular band. The coil retainer is positioned within the ring seal's circumferential groove so that the outer edge of the coil projects outwardly beyond the edge of the ring seal. Meanwhile, the opposed mating surfaces include a fitting including a recess sized and positioned for receipt of the coil retainer's edge. Once press fit into place, the retainer is restrained from inadvertent movement.

Unfortunately, the above-described retainers all suffer from significant disadvantages. For example, the coil retainer and sharp edges of the ring seal are prone to scratching, or otherwise harming, the opposed mating surfaces. This can impede the ring seal's ability to provide a gas or fluid tight seal. Moreover, ring seals having a recessed sealing surface are expensive to manufacture. Meanwhile, the retainer described in U.S. Pat. No. 5,340,170 is capable of use only with a ring seal of an unusual construction. Furthermore, the retainer disclosed in U.S. Pat. No. 5,423,580 also does not protect the edge of a ring seal from unwantingly scratching one of the opposed mating surfaces.

Thus, it would be desirable to provide an improved ring seal and retainer assembly which is inexpensive to manufacture and easy to use.

In addition, it would be desirable to provide an improved ring seal and retainer assembly which does not require recessed sealing surfaces which are expensive to manufacture and difficult to polish.

Moreover, it would be desirable to provide an improved ring seal and retainer assembly which provides protection against damage to a ring seal's sealing surfaces, while not being susceptible to scratching or otherwise marring the opposed mating surfaces prior to forming an air-tight or gas-tight seal.

SUMMARY OF THE INVENTION

The present invention addresses the aforementioned disadvantages by providing an improved ring seal and retainer assembly. To this end, the ring seal is annularly shaped having an axially aligned hole for gas or fluid passage. The ring seal further includes a radial inner surface, a radial outer surface and first and second axial end surfaces. Meanwhile, the retainer is circular in shape, and includes a sidewall which is sized and positioned to cover and engage the ring seal's radial outer surface. The sidewall protects the ring seal's radial outer surface from becoming damaged prior to assembly within a sealing assembly, and protects the opposed mating surfaces from being damaged by preventing the ring seal's outer edge from scratching the opposed mating surfaces during assembly. Moreover, preferably, the retainer's circular sidewall projects axially beyond the ring seal's axial end surfaces. The protruding extremities of the circular sidewall protect the ring seal's axial end surfaces during storage and transportation, thereby eliminating the need for the ring seal having a recessed sealing surface.

The annular retainer includes means for affixing the retainer's circular sidewall adjacent to the ring seal's radial outer surface. In a first embodiment, to maintain the annular retainer affixed to the ring seal, the ring seal includes a circumferential groove which circumnavigates the ring seal's radial outer surface. The circumferential groove may be constructed in similar form to grooves constructed in the prior art; such as the groove including planar walls forming a squared indent. Alternatively, the circumferential groove may be formed in alternative configurations, such as V-shaped or rounded recesses as can be determined by those skilled in the art. Meanwhile, the annular retainer includes a circumferential ridge sized and positioned to project inwardly from the retainer's circular sidewall into the ring seal's circumferential groove. The circumferential ridge projects into the ring seal's groove to inhibit the annular retainer from inadvertently being dislodged or disengaged from the ring seal.

In an alternative embodiment, the annular retainer does not include a single ridge which circumnavigates the annular retainer's interior surface, but instead includes a plurality of ridges which only partially circumnavigate the annular retainer's inner surface. Again, however, the ridges are sized and positioned to project into the ring seal's circumferential groove. In a preferred embodiment, the annular retainer is provided with three ridges positioned at 120° increments around the annular retainer.

In still an additional embodiment of the invention, the annular retainer does not include any inwardly projecting ridges to affix the retainer sidewall adjacent to the ring seal's radial outer surface. Instead, the annular retainer is formed having an inwardly facing "C" shaped cross-section. To this end, the annular retainer's circular sidewall includes upper and lower inwardly projecting edges which grasp the ring seal's axial end surfaces.

The first and second edges of the circular sidewall partially cover and engage the ring seal's axial end surfaces to affix the annular retainer to the ring seal. However, the axial end surfaces remain substantially uncovered by the sidewall edges so that the axial end surfaces can engage and form a seal with two axially opposed mating surfaces. Moreover, the edges project axially beyond the axial end surfaces to provide protection for the axial end surface, thereby eliminating the need for the ring seal including recessed sealing surfaces.

In an additional preferred embodiment of the invention, the annular retainer includes one or more detents which project radially outward from the annular retainer's circular sidewall. The detents are provided to project into a fittings recess to maintain the ring seal and retainer assembly in place between opposed mating surfaces. In one embodiment, the annular retainer is provided with two or three detents which are positioned uniformly (180° or 120°) around the annular retainer's circular sidewall. In an additional embodiment, the annular retainer includes only a single detent which is formed around the entire circumference of the annular retainer.

It is thus an object of the present invention to provide a ring seal and retainer assembly which is very reputable, of high quality, inexpensive to manufacture and reliable for providing a seal between two planar surfaces.

It is still an additional object of the invention to provide an improved ring seal and retainer assembly which does not require recessed sealing surfaces which are expensive to manufacture and difficult to polish.

Moreover, it is an object of the present invention to provide an improved ring seal and retainer assembly which provides protection against damage to a ring seal's sealing surfaces, while not being susceptible to scratching or otherwise marring the opposed mating surfaces prior to forming an air-tight or gas-tight seal.

It is an additional object of the invention to provide a ring seal and retainer assembly which is not prone to being scratched or damaged, and which is not prone to scratching or damaging the mating surfaces between which a seal is sought.

DETAILED DESCRIPTION OF THE DRAWINGS

DETAILED DESCRIPTION OF THE INVENTION

While the present invention is susceptible of embodiment in various forms, as shown in the drawings, hereinafter will be described the presently preferred embodiments of the invention with the understanding that the present disclosure is to be considered as an exemplification of the invention and it is not intended to limit the invention to the specific embodiments illustrated.

As shown in FIGS. 5–28, the ring seal and retainer assembly of the present invention includes a ring seal 1 and a retainer 21. Though the ring seal may be constructed in various configurations as can be determined by those skilled in the art, a preferred ring seal 1 includes an annular body element 3 forming an axially aligned hole for liquid or gas passage. Moreover, due to the annular construction of the ring seal 1, the ring seal includes a radial inner surface 11, a radial outer surface 13, a first axial end surface 7 and a second axial end surface 9. Each of these surfaces may take any number of configurations, including planar or curved constructions. For example, the radial outer surface 13 may be constructed with a curved recess forming a "C" shape, in similar construction as a typical "C seal". Additional suitable constructions for the ring seal include typical "V seals" and "Z seals". As shown in the figures, in a preferred construction, the ring seal's radial outer surface includes a groove 15. The groove may include substantially squared planar surfaces, or the groove may include curved surfaces or other constructions as can be determined by those skilled in the art.

Meanwhile, the first and second axial end surfaces, 7 and 9 respectively, are provided for forming a seal between opposed substantially parallel mating surfaces 17 (see FIG. 13) for forming a fluid or gaseous tight seal between the opposed mating surfaces. As shown in the figures, the ring seal's axial end surfaces 7 and 9 may be substantially planar. Alternatively, the seal of the ring seals 1 may include a recessed sealing surface or may include one or more concentric circular projections (not shown) rising from the surface of the axial end surfaces. The circular projections are typically only a few thousandths of an inch high and undergo significant plastic deformation when the ring seal is compressed to provide a gas or liquid tight seal.

The retainer for use with the ring seal and retainer assembly of the present invention includes a circular sidewall 23 sized and positioned to substantially engage and cover the ring seal's radial outer surface 13. In particular, the circular sidewall 23 extends axially so as to cover and engage the ring seal's radial outer surface 13 so as to inhibit the ring seal's sharp metal edge from scratching or otherwise marring the sealing surfaces during assembly between two opposed sealing surfaces. Preferably, however, as shown in FIGS. 12, 19, 27 and 28, the retainer's circular sidewall has an axial length sufficient to project beyond the ring seal's axial surfaces. Projecting the circular sidewall beyond the ring seal's axial end surfaces provides protection to the ring seal during storage and inhibits the ring seal from becoming scratched or damaged when placed upon a flat surface where dirt or metal shavings could scratch the axial end surfaces of the ring seal. Accordingly, a retainer having a circular sidewall that projects axially beyond the axial end surfaces eliminates the need for the ring seal having costly recessed sealing surfaces (see FIGS. 1 and 4).

The retainer's circular sidewall 23 may be affixed to the ring seal 1 by several constructions. With reference to FIGS. 5–13, in a first embodiment, the annular ring seal 1 includes a circumferential groove 15, while the retainer 21 includes a ridge 25 which is concentrically formed to project inwardly from the retainer's circular sidewall 23. As shown in FIGS. 5–13, the ridge is sized and positioned to circumnavigate the inner surface of the retainer's circular sidewall so as to project into the ring seal when the ring seal and retainer are assembled together. Once assembled, the retainer's circular sidewall restricts tangential motion of the retainer relative to the ring seal while the retainer's inwardly projecting ridge inhibits axial movement of the retainer relative to the ring seal thereby affixing the retainer to the ring seal.

With reference to FIGS. 14–21, in an additional preferred embodiment of the invention, instead of the retainer 21 including an inwardly projecting ridge 25 which circumnavigates the retainer's circular sidewall 23, the retainer includes one or more ridge "segments" 25 which only partially circumnavigate the interior surface of the circular sidewall 23. As shown in the figures, three ridges 25 are provided for affixing the retainer 21 to the ring seal 1. However, any number of ridges 25 may be provided without departing from the spirit and scope of the invention. Again, the ridge segments are sized and positioned to project into the groove formed into the ring seal's radial outer surface to inhibit axial movement of the retainer relative to the ring seal.

With reference to FIGS. 22–28, in still an additional preferred embodiment, the retainer 21 is affixed to the ring seal by the retainer including inwardly projecting edges 29. As opposed to the retainer including an inwardly projecting ridge, or ridge segments 25, which project into the ring seal's circular groove 15, the retainer 21 includes upper and lower edge portions 29 which project inwardly from the top and bottom of the retainer's circular sidewall 23 so as to grasp and engage a ring seal's axial end surfaces. To this end, the retainer forms an inwardly facing "C" cross-section in which the recess of the "C" envelops the ring seal's radial outer surface 13 and a small portion of the axial end surfaces 13. However, the axial end surfaces remain substantially uncovered by the retainer's inwardly projecting edges 29 so that the axial end surfaces can engage and form a seal with two axially opposed mating surfaces.

With reference again to FIGS. 14–21, in still an additional preferred embodiment of the invention, the retainer includes one or more detents 27 which project radially outward from the retainer's circular sidewall 23. A retainer including detents is intended to be used when opposed mating surfaces 17 include a fitting having a recess sized and positioned for receipt of such detents. More particularly, with reference to FIGS. 13 and 28, a seal assembly 39 typically includes a fixture 41 for concentric receipt of the ring seal and retainer assembly 35. The ring seal and retainer assembly 35 may be affixed within the fixture 41 by a press fit arrangement. Alternatively, many fixtures include a circular recess sized and positioned for receipt of prior art retainers, such as coil retainers shown in FIGS. 2 and 3. To this end, a preferred retainer of the present invention includes detents 27 which are sized and configured to project into circular recesses typically found on preexisting seal assembly fixtures 41. In a preferred embodiment, the retainer is provided with three detents positioned at 120° increments around the retainer. However, the retainer may include any number of detents without departing from the spirit and scope of the invention. For example, the retainer may include a single detent which circumnavigates the entire outer circular sidewall 23 of the retainer to provide a circular detent (not shown in the figs.). Alternatively, the circular sidewall may be constructed to have upper and lower surfaces which come together to form an outwardly projecting ridge, functioning as a detent.

The ring seal 1 and retainer 21 of the present invention may be manufactured by various techniques known to those skilled in the art. Furthermore, the retainer may be constructed to include a slit 15 to assist in affixing the retainer to the ring seal.

Moreover, the ring seal and retainer may be constructed of various materials known to those skilled in the art. It is preferred that the ring seal 1 be manufactured of a metal such as aluminum, copper, silver, nickel, steel or stainless steel. Meanwhile, preferably the retainer is made of various plastics such as polypropylene. However, the ring seal and retainer may be manufactured of other materials without departing from the spirit and scope of the invention.

Having described the invention in such terms to enable those skilled in the art to make and use it and having identified the presently understood best mode of practicing it, I claim:

1. A ring seal and retainer assembly wherein said ring seal is adapted to be compressed and decompressed in the axial direction for making a sealed joint between first and second axially mating opposed surfaces, the ring seal and retainer assembly comprising:

an annularly shaped ring seal having an axially aligned hole for gas or fluid passage, a radial inner surface, a radial outer surface, and substantially uncovered first and second axial end surfaces constructed to engage the axially opposed mating surfaces, said radial outer surface including a circumferential groove at least partially circumnavigating said radial outer surface;

a retainer having an outer circular sidewall, said retainer substantially circumnavigating said ring seal so that said circular sidewall predominantly covers and engages said ring seal's radial outer surface;

attachment means for attaching said retainer to said ring seal; and said ring seal's first and second axial end surfaces being predominately uncovered by said retainer so as to enable said uncovered portions of said first and second axial end surfaces to engage and form a seal with two axially opposed surfaces.

2. The ring seal and retainer assembly of claim 1 wherein said circular sidewall projects axially beyond the edges of said ring seal's axial end surfaces.

3. The ring seal and retainer assembly of claim 1 wherein said attachment means is provided by said ring seal's radial outer surface including a circumferential groove at least partially circumnavigating said radial outer surface, and said retainer including one or more ridges sized and positioned to project inwardly from said circular sidewall into said groove.

4. The ring seal and retainer assembly of claim 1 wherein said attachment means is provided by said retainer having a "c" shaped cross section defining a first inwardly projecting edge, a second inwardly projecting edge and an outer circular sidewall, said retainer substantially circumnavigating said ring seal so that said first edge partially covers and engages said rings seal's first axial end surface, said second edge partially covers and engages said rings seal's second axial end surface, and said outer circular sidewall substantially covers said ring seal's radial outer surface.

5. A ring seal and retainer assembly wherein said ring seal is adapted to be compressed and decompressed in the axial direction for making a sealed joint between first and second axially opposed surfaces, the ring seal and retainer assembly comprising:

an annularly shaped ring seal having an axially aligned hole for gas or fluid passage, a radial inner surface, a radial outer surface, and substantially uncovered first and second axial end surfaces constructed to engage the axially opposed mating surfaces, said radial outer surface including a circumferential groove at least partially circumnavigating said radial outer surface;

an annular retainer having an outer circular sidewall and one or more ridges sized and positioned to project inwardly from said circular sidewall into said groove, said retainer substantially circumnavigating said ring seal so that said circular sidewall predominantly covers and engages said ring seal's radial outer surface;

said ring seal's first and second axial end surfaces being predominately uncovered by said annular retainer so as to enable said uncovered portions of said first and second axial end surfaces to engage and form a seal with two axially opposed surfaces.

6. The ring seal and retainer assembly of claim 5 wherein said circular sidewall projects axially beyond the edges of said ring seal's axial end surfaces.

7. The ring seal and retainer assembly of claim 5 wherein said annular retainer includes one or more detents radially projecting outward from said circular sidewall, said detents sized and configured to reside within an annular recess for holding the ring seal and retainer assembly in place between two axially opposed mating surfaces.

8. The ring seal and retainer assembly of claim 7 wherein said annular retainer includes a single circular detent circumnavigating the outer surface of said circular sidewall.

9. The ring seal and retainer assembly of claim 5 wherein said ring seal's groove circumnavigates said outer radial surface, and said annular retainer includes three ridges projecting from said circular sidewall into said groove and three detents radially projecting outward from said circular sidewall.

10. A ring seal and retainer assembly wherein said ring seal is adapted to be compressed and decompressed in the axial direction for making a sealed joint between first and second axially opposed surfaces, the ring seal and retainer assembly comprising:

an annularly shaped ring seal having an axially aligned hole for gas or fluid passage, a radial inner surface, a radial outer surface, and substantially uncovered first and second axial end surfaces constructed to engage the axially opposed mating surfaces, said radial outer surface including a circumferential groove circumnavigating said radial outer surface;

an annular retainer having an outer circular sidewall and a circumferential ridge sized and positioned to project from said circular sidewall into said groove, said retainer substantially circumnavigating said ring seal so that said circular sidewall predominantly covers and engages said rings seal's radial outer surface, said ring seal's first and second axial end surfaces being predominately uncovered by said annular retainer so as to enable said uncovered portions of said first and second axial end surfaces to engage and form a seal with two axially opposed surfaces.

11. The ring seal and retainer assembly of claim 10 wherein said circular sidewall projects axially beyond the edges of said ring seal's axial end surfaces.

12. The ring seal and retainer assembly of claim 11 wherein said annular retainer includes one or more detents radially projecting outward from said circular sidewall, said detent sized and configured to reside within an annular recess for holding the ring seal and retainer assembly in place between two axially opposed surfaces.

13. The ring seal and retainer assembly of claim 12 wherein said annular retainer includes a single circular detent circumnavigating the outer surface of said circular sidewall.

14. The ring seal and retainer assembly of claim 12 wherein said retainer includes three detents positioned at 120° increments around said retainer.

15. A ring seal and retainer assembly wherein said ring seal is adapted to be compressed and decompressed in the axial direction for making a sealed joint between first and second axially opposed surfaces, the ring seal and retainer assembly comprising:

an annularly shaped ring seal having an axially aligned hole for gas or fluid passage, a radial inner surface, a radial outer surface, and substantially uncovered first and second axial end surfaces constructed to engage the axially opposed surfaces;

an annular retainer having a "c" shaped cross section defining a first inwardly projecting edge, a second inwardly projecting edge and an outer circular sidewall, said retainer substantially circumnavigating said ring seal so that said first edge partially covers and engages said rings seal's first axial end surface, said second edge partially covers and engages said rings seal's second axial end surface, and said outer circular sidewall predominantly covers said ring seal's radial outer surface;

said ring seal's first and second axial end surfaces being predominately uncovered by said annular retainer so as to enable said uncovered portions of said first and second axial end surfaces to engage and form a seal with two axially opposed surfaces.

16. The ring seal and retainer assembly of claim 15 wherein said circular sidewall projects axially beyond the edges of said ring seal's axial end surfaces.

17. The ring seal and retainer assembly of claim 15 wherein said annular retainer includes a circular detent projecting radially outward from said circular sidewall, said detent sized and configured to reside within an annular recess for holding the ring seal and retainer assembly in place between two axially opposed surfaces.

18. The ring seal and retainer assembly of claim 17 wherein said annular retainer's outer sidewall includes a first circular segment and a second circular segment, said first segment projecting radially outward from said first edge, and said second segment projecting radially outward from said second edge, said first and second segments intersecting intermediate to said first and second edges to form said circular detent.

19. The ring seal and retainer assembly of claim 15 wherein said annular retainer includes one or more detents radially projecting outward from said circular sidewall, said detent sized and configured to reside within an annular recess for holding the ring seal and retainer assembly in place between two axially opposed surfaces.

20. The ring seal and retainer assembly of claim 19 wherein said retainer includes three detents positioned at 120° increments around said retainer.

* * * * *